US011045725B1

(12) United States Patent
Sawyer et al.

(10) Patent No.: US 11,045,725 B1
(45) Date of Patent: *Jun. 29, 2021

(54) CONTROLLER VISUALIZATION IN VIRTUAL AND AUGMENTED REALITY ENVIRONMENTS

(71) Applicant: Valve Corporation, Bellevue, WA (US)

(72) Inventors: David Sawyer, Bellevue, WA (US);
Tristan Reidford, Bellevue, WA (US);
Yasser Malaika, Seattle, WA (US);
Alan Yates, Bellevue, WA (US);
Jeremy Selan, Kirkland, WA (US)

(73) Assignee: Valve Corporation, Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/412,019

(22) Filed: May 14, 2019

Related U.S. Application Data

(63) Continuation of application No. 15/055,592, filed on Feb. 27, 2016, now Pat. No. 10,286,308, which is a
(Continued)

(51) Int. Cl.
*A63F 13/26* (2014.01)
*G06F 3/0346* (2013.01)
(Continued)

(52) U.S. Cl.
CPC ............ *A63F 13/26* (2014.09); *A63F 13/537* (2014.09); *G02B 27/017* (2013.01);
(Continued)

(58) Field of Classification Search
CPC ..... A63F 13/26; A63F 13/537; G02B 27/017; G02B 27/0179; G06F 3/011; G06F 3/0304
See application file for complete search history.

(56) References Cited

U.S. PATENT DOCUMENTS

| | | | |
|---|---|---|---|
| 4,818,107 A * | 4/1989 | Ono | E02F 3/847 340/988 |
| 5,100,229 A | 3/1992 | Lundberg et al. | |

(Continued)

FOREIGN PATENT DOCUMENTS

| | | |
|---|---|---|
| CN | 103384895 A | 11/2013 |
| EP | 1434029 A2 | 6/2004 |

(Continued)

OTHER PUBLICATIONS

Extended European Search Report (in English) of European Patent App. No. 16756537 (PCT/US2016/019993), dated Sep. 24, 2018, search completion Sep. 11, 2018 from ISA/European Patent office (EPO).

(Continued)

*Primary Examiner* — Ariel A Balaoing
(74) *Attorney, Agent, or Firm* — Seed IP Law Group LLP

(57) ABSTRACT

Controller visualization systems and methods for use in virtual/augmented reality environments such as walk-around virtual reality environments are described. The virtual representation of a physical control device may be altered based on the context of the virtual environment. Certain embodiments combine the virtual rendering of the tracked control device with a real-time video representation of part of the operating space. In certain embodiments, the display of additional information relating to the function of interactive elements may be displayed based on context, such as when a specific action is required from a user in the virtual space.

18 Claims, 6 Drawing Sheets

Related U.S. Application Data continuation-in-part of application No. 14/937,844, filed on Nov. 10, 2015, now Pat. No. 10,338,186.

(60) Provisional application No. 62/126,352, filed on Feb. 27, 2015, provisional application No. 62/077,374, filed on Nov. 10, 2014, provisional application No. 62/126,358, filed on Feb. 27, 2015.

(51) Int. Cl.
| | | |
|---|---|---|
| *G06F 3/01* | (2006.01) | |
| *G02B 27/01* | (2006.01) | |
| *A63F 13/537* | (2014.01) | |
| *G06F 3/03* | (2006.01) | |

(52) U.S. Cl.
CPC .......... *G02B 27/0179* (2013.01); *G06F 3/011* (2013.01); *G06F 3/0304* (2013.01); *G06F 3/0346* (2013.01); *G02B 2027/014* (2013.01); *G02B 2027/0187* (2013.01)

(56) References Cited

U.S. PATENT DOCUMENTS

| | | | |
|---|---|---|---|
| 5,247,487 A | 9/1993 | Beliveau et al. | |
| 5,729,475 A | 3/1998 | Romanik, Jr. | |
| 5,767,960 A | 6/1998 | Orman | |
| 5,884,239 A | 3/1999 | Romanik, Jr. | |
| 5,946,087 A | 8/1999 | Kasori et al. | |
| 6,286,607 B1 | 9/2001 | Ohtomo et al. | |
| 6,433,866 B1 | 8/2002 | Nichols | |
| 6,630,993 B1* | 10/2003 | Hedges | G01C 15/002 356/141.4 |
| 6,646,732 B2 | 11/2003 | Ohtomo et al. | |
| 6,756,581 B2 | 6/2004 | Ohtomo et al. | |
| 6,972,734 B1* | 12/2005 | Ohshima | A63F 13/10 345/8 |
| 7,903,109 B2* | 3/2011 | Rurin | G06T 15/20 345/419 |
| 2002/0005944 A1 | 1/2002 | Pratt et al. | |
| 2003/0227392 A1* | 12/2003 | Ebert | H04L 67/12 340/8.1 |
| 2006/0082546 A1* | 4/2006 | Wey | G06F 3/0346 345/156 |
| 2007/0072662 A1* | 3/2007 | Templeman | G06F 3/012 463/6 |
| 2008/0004796 A1* | 1/2008 | Schott | G01C 21/005 701/434 |
| 2008/0211771 A1* | 9/2008 | Richardson | G06F 3/012 345/158 |
| 2009/0058850 A1* | 3/2009 | Fun | G06F 3/04815 345/419 |
| 2009/0122058 A1 | 5/2009 | Tschesnok | |
| 2009/0244097 A1* | 10/2009 | Estevez | G06F 1/1613 345/633 |
| 2010/0050094 A1* | 2/2010 | Lewis | G06T 7/20 715/757 |
| 2012/0242678 A1* | 9/2012 | Border | G06F 3/017 345/589 |
| 2013/0194164 A1* | 8/2013 | Sugden | G06F 3/167 345/8 |
| 2013/0328928 A1* | 12/2013 | Yamagishi | A63F 13/25 345/633 |
| 2014/0049558 A1* | 2/2014 | Krauss | G02B 27/017 345/633 |
| 2015/0097719 A1 | 4/2015 | Balachandreswaran et al. | |
| 2016/0131761 A1* | 5/2016 | Yates | G01S 1/70 356/3.11 |
| 2016/0217623 A1* | 7/2016 | Singh | G09G 3/003 |
| 2016/0225188 A1* | 8/2016 | Ruddell | G06T 19/006 |
| 2016/0343164 A1* | 11/2016 | Urbach | G06T 19/006 |
| 2017/0262045 A1* | 9/2017 | Rouvinez | G06F 3/011 |

FOREIGN PATENT DOCUMENTS

| | | |
|---|---|---|
| GB | 2213673 A | 8/1989 |
| JP | 2000-132325 A | 5/2000 |
| JP | 2003-526774 A | 9/2003 |
| JP | 2005-114452 A | 4/2005 |
| JP | 2008-300983 A | 12/2008 |
| WO | 00/57133 A1 | 9/2000 |
| WO | 2013/049248 A2 | 4/2013 |
| WO | 2016/077401 A1 | 5/2016 |

OTHER PUBLICATIONS

European Search Report (in English) of European Patent App. No. 1 234 029 A3, dated Feb. 23, 2009, from ISA/European Patent Office (EPO).
International Search Report (in English) of Int. App. No. PCT/US00/07504, dated Jul. 19, 2000, search completion Jul. 11, 2000 from ISA/European Patent Office (EPO).
International Patent Abstract (in English) of International Patent App. No. WO 00/57133 A3 (PCT/US0007504), published on Sep. 28, 2000.
GB Patent Abstract (in English) of GB Patent App. No. 2213673, published Aug. 16, 1989, retrieved on Sep. 27, 2018 from https://www.ipo.gov.uk/p-jpsum/Case/PublicationNumber/GB2213673.
WIPO Patent Abstract (in English) of Int. Pub. No. WO 2016/077401 A1 (EP 3 218 736 A0—PCT/US2015/060045), published on May 19, 2016.
English translation of the Office Action for JP patent application No. 2017-545583 dated May 16, 2019 from the Japanese Patent Office.
Notice of Reasons for Rejection for JP application No. 2017-545583 dated Oct. 3, 2019, 4 pages, with English translation.
English translation of the Office Action for CN patent application No. 201680012555.5 dated Jul. 16, 2020 from the National Intellectual Property Administration of the Peoples Republic of China.
English translation of the Search Report for CN patent application No. 201680012555.5 dated Jul. 3, 2020.

\* cited by examiner

CONTROLLER VISUALIZATION IN VIRTUAL AND AUGMENTED REALITY ENVIRONMENTS

CROSS-REFERENCE TO RELATED APPLICATIONS

This application claims the benefit of Provisional Application Ser. No. 62/126,352, filed on Feb. 27, 2015, and is a continuation of patent application Ser. No. 15/055,592 filed on Feb. 27, 2016, which is a continuation-in-part of patent application Ser. No. 14/937,844 filed on Nov. 10, 2015, which claims the benefit of Provisional Application Ser. Nos. 62/077,374, filed on Nov. 10, 2014, and 62/126,358, filed on Feb. 27, 2015. The contents of all of those applications are incorporated herein by reference for all purposes.

BACKGROUND OF THE DISCLOSURE

1. Field of the Disclosure

This disclosure relates generally to controller visualization in virtual/augmented reality environments. More specifically, aspects of the present disclosure relate to systems and methods for the representation and augmentation of physical controller devices in a virtual or augmented reality environment.

2. General Background

Various augmented and/or virtual reality systems and/or environments are known. One current generation of desktop virtual reality ("VR") experiences is created using head-mounted displays ("HMDs"), which can be tethered to a stationary computer (such as a personal computer ("PC"), laptop, or game console), or self-contained. Such desktop VR experiences generally try to be fully immersive and disconnect the users' senses from their surroundings.

When utilizing a physical control device for interacting with a virtual environment, a user wearing a head-mounted display showing only the virtual space may experience problems finding and interacting with the control elements provided on the control device. Such a user may also be uncertain of the function of interactive elements, such as buttons, on the control device.

It is typical to operate simulated items in a virtual space using physical controllers existing in an operating space. The simulated items are sometimes shaped to resemble the controlling devices to some degree and vice versa (e.g., a gun-shaped controller to operate a gun in the virtual world), but these solutions are typically either rather inaccurate or have been hard-coded for a specific control device.

It is desirable to address the current limitations in this art.

BRIEF DESCRIPTION OF THE DRAWINGS

By way of example, reference will now be made to the accompanying drawings, which are not to scale.

DETAILED DESCRIPTION

Those of ordinary skill in the art will realize that the following description of the present invention is illustrative only and not in any way limiting. Other embodiments of the invention will readily suggest themselves to such skilled persons, having the benefit of this disclosure, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. Reference will now be made in detail to specific implementations of the present invention as illustrated in the accompanying drawings. The same reference numbers will be used throughout the drawings and the following description to refer to the same or like parts.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Figure 1:
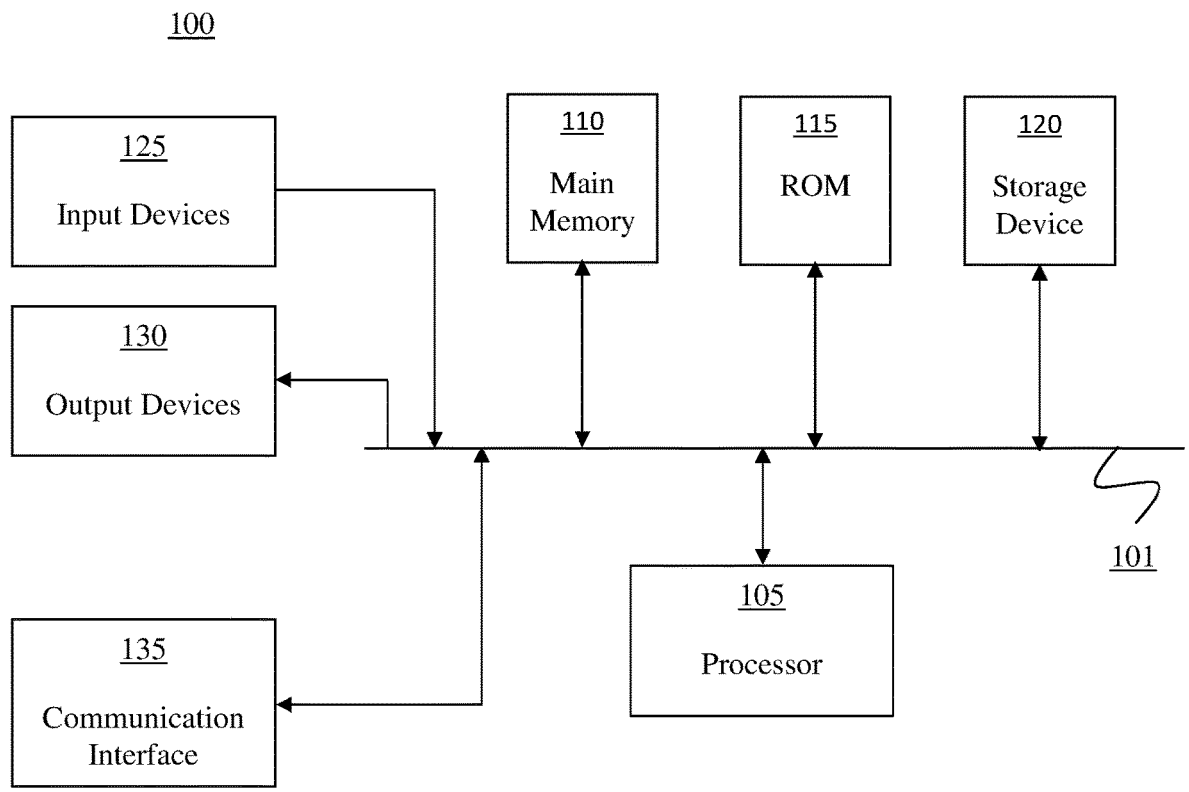
FIG. 1 is an exemplary diagram of a computing device that may be used to implement aspects of certain embodiments of the present invention.

FIG. 1 is an exemplary diagram of a computing device 100 that may be used to implement aspects of certain embodiments of the present invention. Computing device 100 may include a bus 101, one or more processors 105, a main memory 110, a read-only memory (ROM) 115, a storage device 120, one or more input devices 125, one or more output devices 130, and a communication interface 135. Bus 101 may include one or more conductors that permit communication among the components of computing device 100. Processor 105 may include any type of conventional processor, microprocessor, or processing logic that interprets and executes instructions. Main memory 110 may include a random-access memory (RAM) or another type of dynamic storage device that stores information and instructions for execution by processor 105. ROM 115 may include a conventional ROM device or another type of static storage device that stores static information and instructions for use by processor 105. Storage device 120 may include a magnetic and/or optical recording medium and its corresponding drive. Input device(s) 125 may include one or more conventional mechanisms that permit a user to input information to computing device 100, such as a keyboard, a mouse, a pen, a stylus, handwriting recognition, voice recognition, biometric mechanisms, and the like. Output device(s) 130 may include one or more conventional mechanisms that output information to the user, including a display, a projector, an A/V receiver, a printer, a speaker, and the like. Communication interface 135 may include any transceiver-like mechanism that enables computing device/server 100 to communicate with other devices and/or systems. Computing device 100 may perform operations based on software instructions that may be read into memory 110 from another computer-readable medium, such as data storage device 120, or from another device via communication interface 135. The software instructions contained in memory 110 cause processor 105 to perform processes that will be described later. Alternatively, hardwired circuitry may be used in place of or in combination with software instructions to implement processes consistent with the present invention. Thus, various implementations are not limited to any specific combination of hardware circuitry and software.

In certain embodiments, memory 110 may include without limitation high-speed random access memory, such as DRAM, SRAM, DDR RAM or other random access solid state memory devices; and may include without limitation non-volatile memory, such as one or more magnetic disk storage devices, optical disk storage devices, flash memory devices, or other non-volatile solid state storage devices. Memory 110 may optionally include one or more storage devices remotely located from the processor(s) 105. Memory 110, or one or more of the storage devices (e.g., one or more non-volatile storage devices) in memory 110, may include a computer readable storage medium. In certain embodiments, memory 110 or the computer readable storage medium of memory 110 may store one or more of the following programs, modules and data structures: an operating system that includes procedures for handling various basic system services and for performing hardware dependent tasks; a network communication module that is used for connecting computing device 110 to other computers via the one or more communication network interfaces and one or more communication networks, such as the Internet, other wide area networks, local area networks, metropolitan area networks, and so on; a client application that may permit a user to interact with computing device 100.

Figure 2:
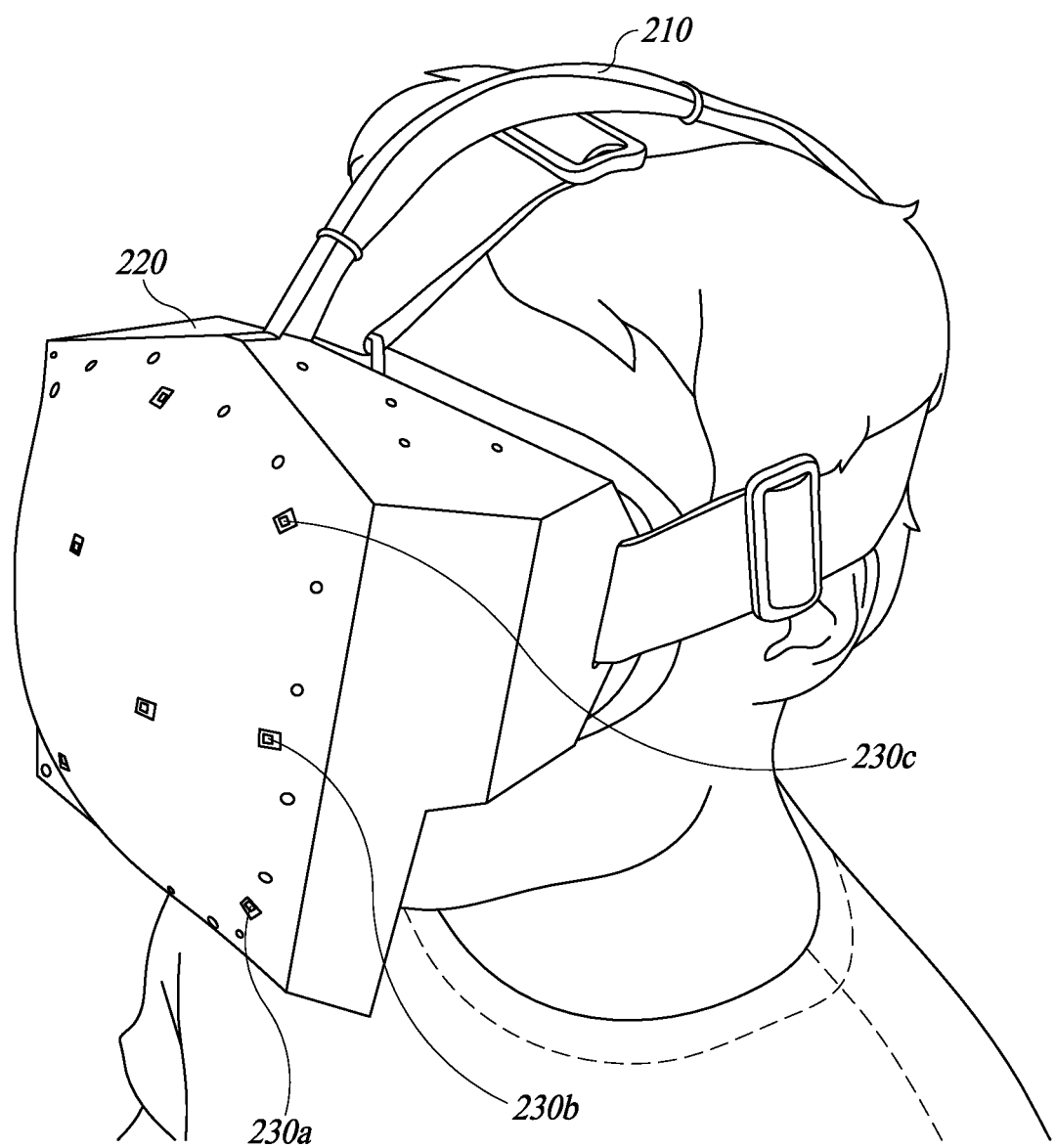
FIG. 2 is an exemplary diagram of a human user wearing a head-mounted virtual reality apparatus comprising optical receivers and sensors that may be used to implement aspects of certain embodiments of the present invention.

Certain embodiments of the present invention comprise a trackable head-mounted display ("HMD") 220, with at least three degrees of freedom in an operating space and optionally one or more sensors with at least two degrees of freedom of positional tracking. FIG. 2 is an exemplary diagram of a human user 210 wearing a head-mounted virtual reality apparatus 220 comprising optical receivers and sensors (230a, 230b, 230c, etc.) that may be used to implement aspects of certain embodiments of the present invention. The HMD and the optional sensors provide sensory input to a controller, which in turn provides sensory feedback to the HMD or another output device. Without limitation, the HMD may be tethered to a stationary computer (such as a personal computer ("PC"), laptop, or game console), or alternatively may be self-contained (i.e., with some or all sensory inputs, controllers/computers, and outputs all housed in a single head-mounted device).

Aspects of the present invention address limitations in the art by transposing a physical controller available to the user into a virtual reality environment in a realistic or augmented form. Aspects of the present invention improve on existing solutions in certain embodiments by simulating the actual device held by the user or a variation thereof that is tailored to the virtual environment and/or provides context-specific information.

Figure 3:
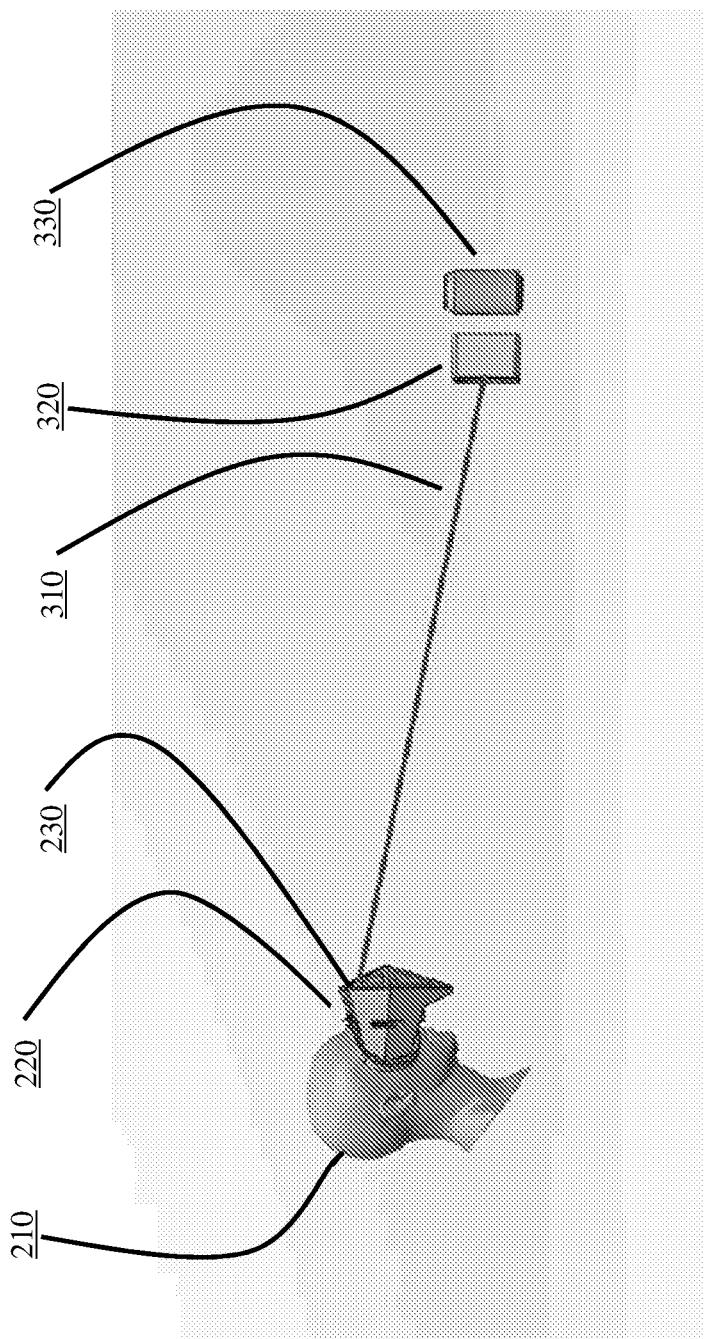
FIG. 3 is an exemplary diagram of a transmitter/receiver configuration in an optical positional tracking system that may be used to implement aspects of certain embodiments of the present invention.

FIG. 3 is an exemplary diagram of a transmitter/receiver configuration in an optical positional tracking system that may be used to implement aspects of certain embodiments of the present invention. As depicted in FIG. 3, an exemplary optical positional tracking system comprises a base station 320 that sweeps an optical signal 310 across the tracking volume. Depending on the requirements of each particular implementation, more than one base station may be incorporated, and each base station may generate more than one optical signal. For example, while a single base station is typically sufficient for six-degree-of-freedom tracking, multiple base stations may be necessary in some embodiments to provide robust room-scale tracking for headsets and peripherals. Optical receivers (e.g., 330) are incorporated into the head-mounted virtual reality apparatus (220) or other tracked objects. In certain embodiments, optical receivers are paired with an accelerometer and gyroscope Inertial Measurement Unit ("IMU") on each tracked device to support low-latency sensor fusion. As shown in FIG. 21, a standard 12-ounce soda or beer can 330 is depicted to provide a sense of scale.

Each base station 320 according to certain embodiments contains two rotors, which sweep a linear beam 310 across the scene on orthogonal axes. At the start of each sweep cycle, the base station 320 according to certain embodiments emits an omni-directional light pulse ("sync signal") visible to all sensors. Thus, each sensor computes a unique angular location in the swept volume by timing the duration between the sync signal and the beam signal. Sensor distance and orientation is solved using multiple sensors affixed to a single rigid body.

Figure 4:
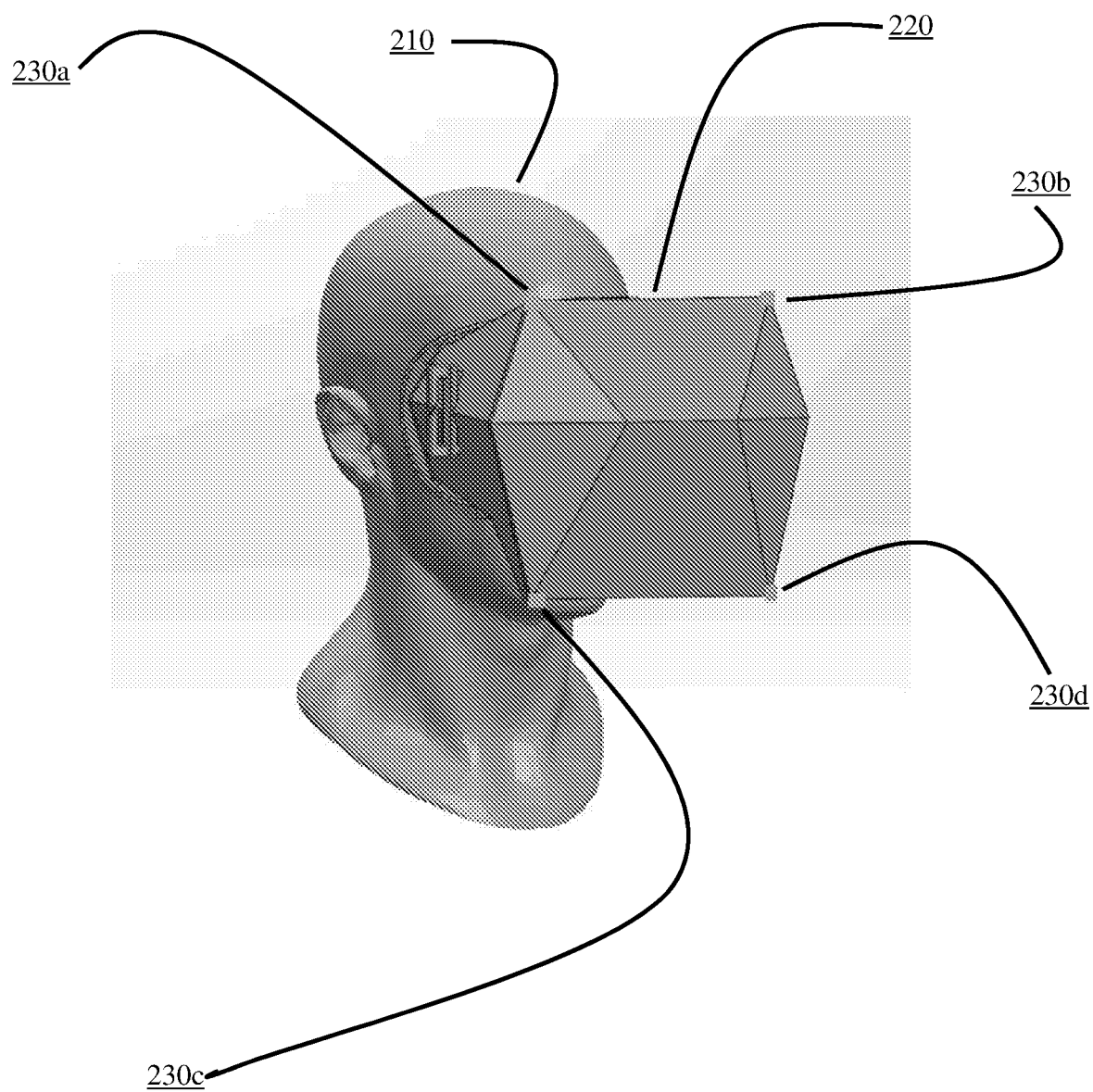
FIG. 4 is an exemplary diagram of a head-mounted virtual reality display according to aspects of the present invention, with four optical receivers.

FIG. 4 is an exemplary diagram of a head-mounted virtual reality display 220 with four optical receivers (230a, 230b, 230c, 230d) that may be used to implement aspects of certain embodiments of the present invention.

In certain embodiments it is assumed that the illuminated volume will be largely free of reflecting objects and surfaces. Reflections can cause spurious signals for the sensor system. The effect of first-order reflections can be reduced or eliminated in certain embodiments by using a circularly polarized radiation source at the base station and suitable matched circular polarizing filters at the sensors.

A sensor according to certain embodiments comprises an optoelectronic device capable of detecting the modulated light from the rotor. For visible or near-infrared ("NIR") light, silicon photodiodes and suitable amplifier/detector circuitry are preferred in certain embodiments. Because the environment may contain static and time-varying signals with similar wavelengths to the base station signals (optical noise) it is helpful to modulate the base station light in such a way as to make it easy to differentiate from any interfering signals, and/or to filter the sensor from any wavelength of radiation other than that of base station signals.

In certain embodiments, the invention comprises (1) a database of three-dimensional virtual representations of a variety of physical control devices, (2) a programming interface allowing (a) the identification of the specific kind of control device operated by the user, (b) optionally the control device's placement and orientation in three-dimensional space, (c) optionally the collection of information about the virtual reality environment context that the control device is used to interact with as well as the function associated with interactive elements on the control device inside such virtual environment, and (d) optionally the collection of context information from the operating space, including, without limitation, notifications about events occurring in the host operating system or other devices such as mobile phones.

Figure 5:
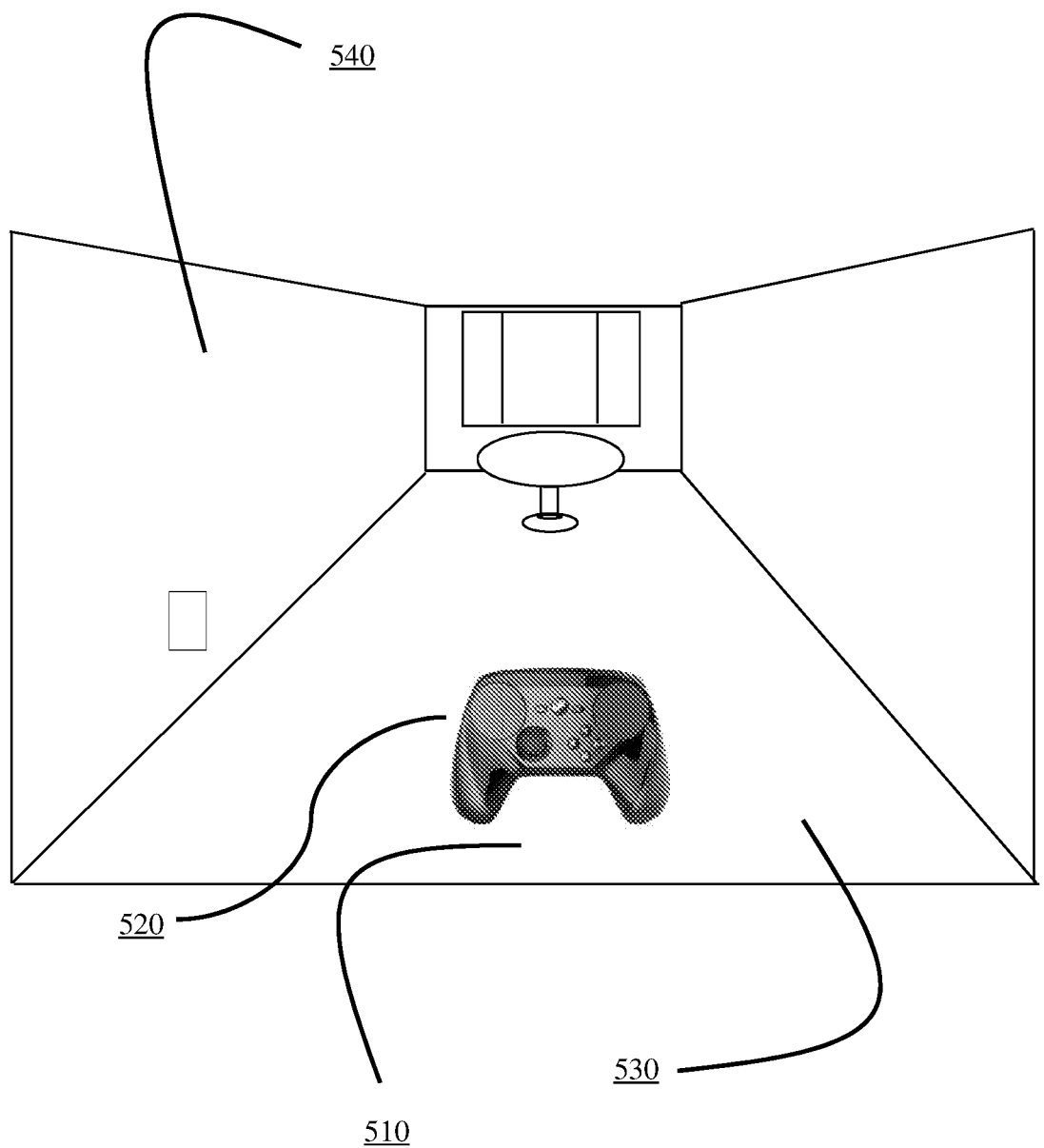
FIG. 5 is an exemplary display in a virtual reality environment according to certain embodiments of the present invention, in which a virtual image of a real game controller is in view

FIG. 5 is an exemplary display in a virtual reality environment 540, in which a virtual image of a real game controller 520 is in view of a human user 510 holding the controller 520.

A controller program in certain embodiments collects the input according to (2)(a)-(d) above and provides the user with a virtual representation of the user's physical control device that can either be realistic or augmented to reflect the virtual context and/or function of the control device and its interactive elements.

Figure 6:
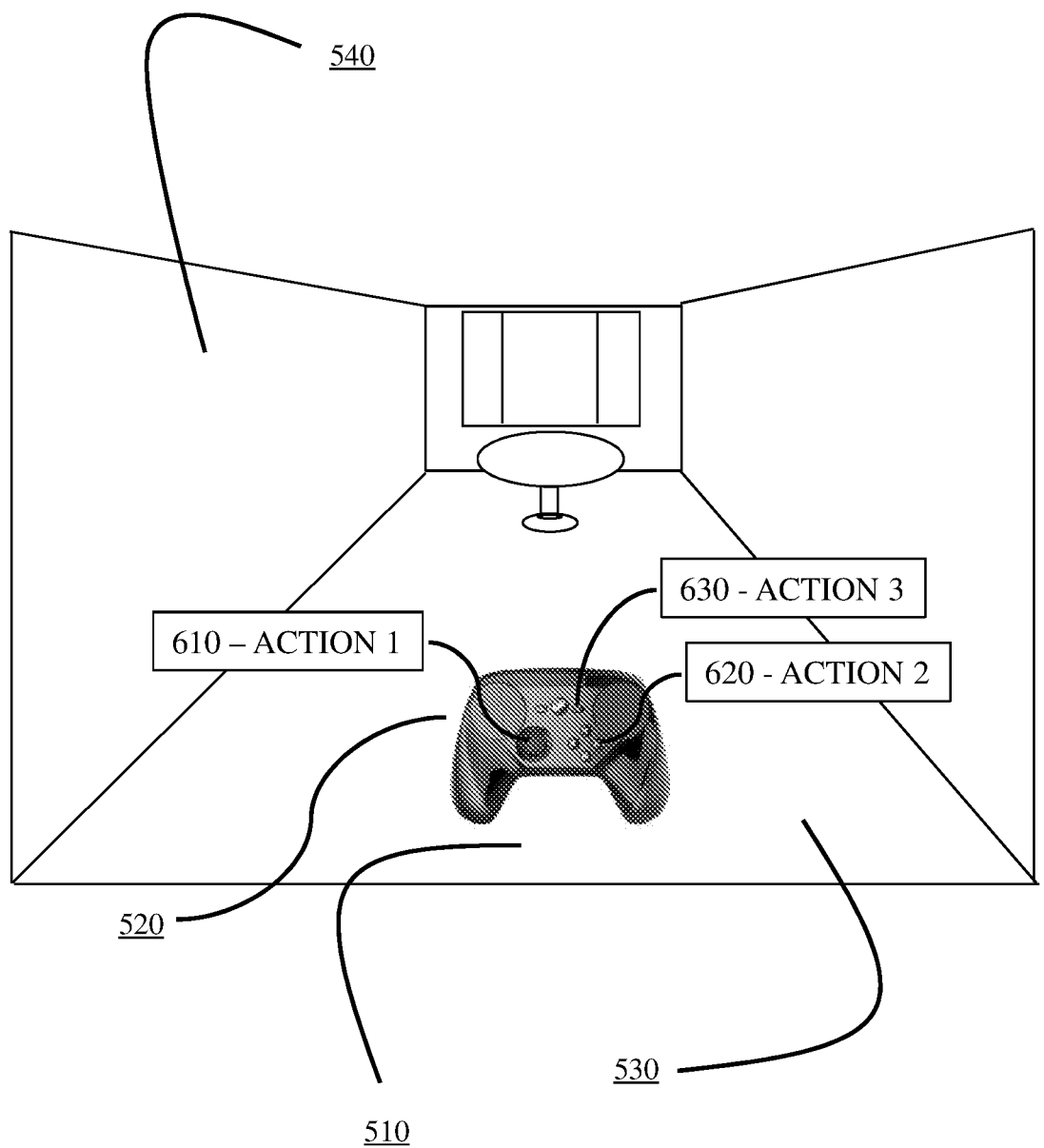
FIG. 6 is an exemplary display in a virtual reality environment according to certain embodiments of the present invention, in which a virtual image of a real game controller is in view, and in which exemplary flyover text callouts are also superimposed on the displayed image to provide guidance to a user as to specific controller functionality available to be activated at a particular moment in time.

Depending upon the specific requirements of each particular implementation, such an augmented virtual representation of the control device could, without limitation, include a verbal and/or icon-based and/or animation-based labeling of a control device's interactive element(s), such labeling providing information about their function in the virtual environment. For example in FIG. 6, a button controlling the operation of a virtual gun, of a real game controller 520, could be labeled with action labels (610, 620, 630, etc.), like a flyout texts saying, for example "FIRE" or an image of a gun, or other action labels.

The augmented virtual representation according to certain embodiments could also be modified based on the availability of the function associated with an interactive element or other arbitrary information about the context provided by the virtual environment. For example, while a weapon in a virtual reality game in certain embodiments may be non-operational, the interactive element associated with it might be rendered in a dull red, while when charged and ready it might be rendered in a pulsing green. Alternatively, the control device could be rendered with virtual attachments that swap out or animate depending on what part of the virtual environment is being pointed at.

In certain embodiments, physical control devices stored in the database and made available to the user in a virtual reality environment may be, for example and without limitation, video game controllers, keyboards, trackpads or other input devices for personal computers, portable phones or tablet computers, or remote controls for audio/visual equipment and other electronic items. Interactive elements associated with such control devices may be, for example and without limitation, buttons, joysticks, directional pads, software buttons, touch-sensitive input devices, dials, triggers, knobs, motion sensors, and the like.

The virtual representation of the physical control device may be altered in certain embodiments based on the context of the virtual environment. For example, in a virtual reality game taking place in a historic setting, the control device may be represented as being made from a time-appropriate material. Alternatively, in a game in which the user operates a device, such a device's virtual representation may be attached to the representation of his controller.

The virtual representation of the physical control device in certain embodiments may also be altered based on the context of the operating space and/or events taking place outside of the virtual space. For example, the controller might receive a notification through a dedicated interface informing of an incoming phone call or a person ringing at the door. In such a system, the control device's virtual appearance and function may be altered so that an interactive element is assigned an appropriate function and appearance. For an incoming phone call or other means of distance communication, such a function may be answering the call; whereas for the information about a visitor, the preferred action may be to pause the virtual experience. These examples may be replaced by any kind of notification and desirable response that an external system is capable of delivering.

Context- and function-specific representation of information may be connected in certain embodiments. For example, in a virtual reality fishing game, the virtual representation of the control device may be extended by a fishing rod. If the fishing rod in the virtual environment becomes non-functional, its virtual depiction may be shown as being broken.

Context- or function-specific augmentation may be permanent or based on user input, depending on the requirements of specific embodiments. For example, a representation of a control device may reflect its appearance in the real world until the user directs his gaze towards the virtual representation of the control device, at which point it might be augmented by function- or context-specific information. In other examples, such information might be displayed virtually when the user raises the physical control device before his eyes or takes any other pre-defined action.

Furthermore, the display of additional information relating to the function of interactive elements may be displayed in certain embodiments based on context, such as when a specific action is required from a user in the virtual space or when a user has been idle for a while and is assumed to require a reminder as to the expected action.

Certain embodiments reflect a tracked control device's placement and orientation in three-dimensional operating space so that the control device's virtual representation appears in the same position relative to the user's eyes as the physical control device does.

Other embodiments combine the virtual rendering of the tracked control device with a real-time video representation of part of the operating space. For this purpose, a video feed from a camera recording the operating space may be superimposed either directly upon the image seen in the head-mounted display, projected onto the rendered geometry of the virtual space or onto a three-dimensional model of the operating space shown to the user as part of or as a replacement of the virtual space. An example of such an embodiment would be a live video feed of the user's hands (e.g., as viewed by a front-facing camera on the user's HMD) mapped onto the three-dimensional geometry of the control device.

Desirable elements to be extracted from the video feed for this purpose in certain embodiments may be separated by any number of existing methods, such as, without limitation, by motion detection or depth sensing technologies or by marking them with special marker devices to inform the system of their dimensions. These technologies may be combined in any way, as known to skilled artisans.

In certain embodiments, a user generally has two controllers that may be functionally identical. Systems according to aspects of the present invention triangulate from the position of the user's HMD toward the two controllers to determine which of them is in the left hand and which one is in the right hand. If the user switches controllers, they still work in the designed way for left and right hand in certain embodiments.

The controllers are displayed in the virtual/game environment in certain embodiments in the shape that the exist in the real world so the user can find them while wearing the HMD and when he picks them up he gets the same tactile impression that is expected in the real world. In certain embodiments, once the user has picked up a controller and gripped it properly, it may transform into whatever appropriate in-game item it represents, e.g. a magic wand, a laser gun etc.

Aside from in-game information, a controller according to certain embodiments can be set to display notifications from the real world. Thus, in certain embodiments, the controller in the virtual reality world shows a small light when a notification is shown. In such embodiments, when the user turns over the hand holding the controller in-game, a virtual display is shown on the user's lower arm to display, for example, a text message, show the caller ID of a person who is calling the user on the phone, and the like. The user can then dismiss it or interact with it using the controller. In such embodiments, the user is not required to take off the HMD whenever a notification arrives. Depending on the requirements of each particular implementation, notifications may be customized to a particular virtual environment. For example, a science-fiction game may show a glowing LCD display on the lower arm, whereas a fantasy game may show a parchment scroll.

While the above description contains many specifics and certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art, as mentioned above. The invention includes any combination or subcombination of the elements from the different species and/or embodiments disclosed herein.

We claim:

1. An optical tracking system, comprising:
   control circuitry operatively coupleable to one or more optical sensors of a movable tracked object that is positionable within an operating space, in operation, the control circuitry:
   for each of the one or more optical sensors, computes an angular location within the operating space;
   determines the location and orientation of the movable tracked object based on the determined angular location of the one or more optical sensors;
   causes a display to present a virtual visual representation of the movable tracked object in a virtual reality environment with a location and orientation within the virtual reality environment that corresponds to the determined location and orientation of the movable tracked object in the operating space;
   receives context information indicative of the virtual reality environment context in which the movable tracked object is used; and alters the virtual visual representation of the movable tracked object based on the received context information.

2. The system of claim 1, wherein the movable tracked object is located at a first position within the operating space relative to a user's eyes, and wherein the virtual visual representation of the movable tracked object is located at a second position within the virtual reality environment that corresponds to the first position, so that the placement and orientation of the movable tracked object within the virtual reality environment appears in substantially the same position relative to the user's eyes as the movable tracked object appears relative to the user's eyes within the operating space.

3. The system of claim 2, wherein, in operation, the control circuitry alters the virtual visual representation of the movable tracked object based on detecting that a user's gaze has been directed toward the virtual visual representation of the movable tracked object.

4. An optical tracking system, comprising;
   control circuitry operatively coupleable to one or more sensors that are rigidly attached to a movable tracked object that is positionable within an operating space, in operation, the control circuitry:
   for each of the one or more sensors, computes a location within the operating space;
   determines the location and orientation of the movable tracked object based on the determined angular location of the one or more sensors;
   causes a display to present a virtual visual representation of the movable tracked object in a virtual reality environment with a location and orientation within the virtual reality environment that corresponds to the determined location and orientation of the movable tracked object in the operating space;
   receives context information indicative of the virtual reality environment context in which the movable tracked object is used; and
   alters the virtual visual representation of the movable tracked object based on the received context information.

5. The system of claim 4, wherein the movable tracked object is located at a first position within the operating space relative to a user's eyes, and wherein the virtual visual representation of the movable tracked object is located at a second position within the virtual reality environment that corresponds to the first position, so that the placement and orientation of the movable tracked object within the virtual reality environment appears in substantially the same position relative to the user's eyes as the movable tracked object appears relative to the user's eyes within the operating space.

6. The system of claim 4, wherein, in operation, the control circuitry alters the virtual visual representation of the movable tracked object based on detecting that a user's gaze has been directed toward the virtual visual representation of the movable tracked object.

7. The system of claim 4 wherein the control circuitry provides an augmented virtual visual representation of the movable tracked object based on the context of the virtual reality environment.

8. The system of claim 7 wherein the augmented virtual visual representation of the movable tracked object comprises a labeling of at least one interactive element of the movable tracked object that indicates a context-specific function of the at least one interactive element.

9. The system of claim 8 wherein the labeling comprises at least one of icon-based labeling or animation-based labeling.

10. The system of claim 8 wherein the at least one interactive element comprises at least one of a button, joystick, directional pad, software button, touch sensitive input device, dial, trigger, knob, or motion sensor.

11. The system of claim 4 wherein the movable tracked object comprises a video game controller, an input device for a computer, or a remote control device.

12. The system of claim 4 wherein the control circuitry alters the virtual visual representation of the movable tracked object based on the context of at least one of the operating space or an event that takes place outside of the virtual reality environment.

13. The system of claim 4 wherein the control circuitry alters the virtual visual representation of the movable tracked object responsive to a user of the movable tracked object taking a pre-defined action.

14. The system of claim 4 wherein the control circuitry alters the virtual visual representation of the moveable tracked object such that the virtual visual representation of the movable tracked object comprises an item in the virtual reality environment.

15. An optical tracking system, comprising;
control circuitry operatively coupleable to one or more sensors of a movable tracked object that is positionable within an operating space, in operation, the control circuitry:
for each of the one or more sensors, computes a location within the operating space;
determines the location and orientation of the movable tracked object based on the determined angular location of the one or more sensors;
causes a display to present a virtual visual representation of the movable tracked object in a virtual reality environment with a location and orientation within the virtual reality environment that corresponds to the determined location and orientation of the movable tracked object in the operating space;

receives context information indicative of the context of at least one of the operating space or an event that takes place outside of the virtual reality environment; and
alters the virtual visual representation of the movable tracked object based on the received context information,
wherein, in operation, the control circuitry receives a notification from an external device, and alters the virtual visual representation of the movable tracked object based on the received notification.

16. The optical tracking system of claim 15 wherein the notification comprises a notification that the external device is receiving a phone call.

17. The optical tracking system of claim 16 wherein the control circuitry alters the virtual visual representation of the movable object to indicate that an interactive element of the movable tracked object can be selected to answer the incoming phone call.

18. The optical tracking system of claim 15 wherein the notification comprises a notification from the external device that a person is at a door of a user's home.

* * * * *